:::
(12) United States Patent
Webber et al.

(10) Patent No.: US 6,631,920 B1
(45) Date of Patent: Oct. 14, 2003

(54) AIRBAG MODULE

(75) Inventors: James Lloyd Webber, Shelby Township, Macomb County, MI (US); Hans Gert Nilson, Wuppertal (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/251,025

(22) Filed: Feb. 18, 1999

(51) Int. Cl.[7] ............................................. B60R 21/22
(52) U.S. Cl. ................................. 280/730.1; 280/752
(58) Field of Search ........................ 280/730.1, 732, 280/748, 751, 752

(56) References Cited

U.S. PATENT DOCUMENTS

| | | | | |
|---|---|---|---|---|
| 3,904,222 A | * | 9/1975 | Bursott et al. ............... 280/732 |
| 3,966,227 A | * | 6/1976 | Cameron ..................... 280/752 |
| 4,198,075 A | | 4/1980 | Kob et al. |
| 4,427,215 A | * | 1/1984 | Weichenrieder et al. .... 280/752 |
| 4,518,172 A | * | 5/1985 | Bortz et al. .................. 280/751 |
| 4,948,168 A | * | 8/1990 | Adomeit et al. ......... 280/730.1 |
| 5,135,253 A | * | 8/1992 | Hirashima et al. .......... 280/732 |
| 5,295,707 A | * | 3/1994 | Satoh et al. ................. 280/752 |
| 5,312,131 A | | 5/1994 | Kitagawa et al. |
| 5,324,070 A | | 6/1994 | Kitagawa et al. |
| 5,344,184 A | * | 9/1994 | Keeler et al. ............ 280/730.1 |
| 5,382,051 A | | 1/1995 | Glance |
| 5,443,285 A | | 8/1995 | Boll ........................... 280/732 |
| 5,452,913 A | * | 9/1995 | Hansen et al. ............... 280/732 |
| 5,476,283 A | | 12/1995 | Elton |
| 5,536,043 A | * | 7/1996 | Lang et al. ............... 280/730.1 |
| 5,570,901 A | | 11/1996 | Fyrainer |
| 5,630,630 A | * | 5/1997 | Price et al. .................. 292/128 |
| 5,738,368 A | * | 4/1998 | Hammond et al. ....... 280/730.1 |
| 5,823,566 A | * | 10/1998 | Manire ........................ 280/732 |
| 5,941,558 A | * | 8/1999 | Labrie et al. ............... 280/732 |
| 6,024,377 A | * | 2/2000 | Lane, Jr. ...................... 280/732 |
| 6,032,978 A | * | 3/2000 | Spencer et al. .......... 280/730.1 |
| 6,092,836 A | * | 7/2000 | Saslecov .................. 280/730.1 |
| 6,158,763 A | * | 12/2000 | Dominique et al. ......... 280/752 |
| 6,435,554 B1 | * | 8/2002 | Feldman .................. 280/730.1 |
| 6,464,255 B1 | * | 10/2002 | Preisler et al. .............. 280/752 |

FOREIGN PATENT DOCUMENTS

| | | | | |
|---|---|---|---|---|
| DE | 4209604 A1 | * | 10/1992 | ......... B60R/21/045 |
| DE | 4227528 C1 | | 12/1993 | |
| DE | 4445737 A1 | | 6/1995 | |
| WO | WO-98/45144 | * | 10/1998 | ......... B60R/21/045 |

* cited by examiner

Primary Examiner—Paul N. Dickson
Assistant Examiner—Joselynn Y Sliteris
(74) Attorney, Agent, or Firm—Kathryn A. Marra

(57) ABSTRACT

An airbag module is shown for an occupant restraint system of a motor vehicle. The airbag module has a housing in which a folded inflatable airbag is accommodated. A part of the housing is designed as a covering which is movable into the vehicle interior and which supports the knees of the occupant during the unfolding of the airbag. The airbag is designed in such a manner that it can be unfolded through an opening at the housing past the covering and into the vehicle interior when the covering is at least partly moved into the vehicle interior.

23 Claims, 4 Drawing Sheets

AIRBAG MODULE

FIELD OF THE INVENTION

The invention relates to an airbag module for an occupant restraint system of a motor vehicle, comprising a housing in which a folded inflatable airbag is accommodated.

BACKGROUND OF THE INVENTION

An airbag module of the initially named kind is known and is intended to protect the vehicle occupants from injuries in accidents. For this purpose, the airbag is inflated during the accident within a few milliseconds and forms a cushion into which the passenger immerses during the sudden deceleration of the vehicle.

SUMMARY OF THE INVENTION

An object of the invention is to provide an airbag module for an occupant restraint system of a motor vehicle which can be cost-effectively manufactured and which helps to prevent injuries to occupants.

For satisfying this object, an airbag module with the features in accordance with the claims is proposed, in particular an airbag module in which a part of the housing is designed as a covering which is movable into the vehicle interior and which serves during the unfolding of the airbag for supporting the knees of the occupant, and in which the airbag is designed in such a manner that it can be unfolded through an opening at the housing past the covering and into the vehicle interior when the covering is at least partly moved into the vehicle interior. In one embodiment, the moveable covering is a flap which is pivotal about an angle of less than 45 degrees. In one embodiment, the movable covering is a flap which is pivotal about an angle of less than 45°.

In the invention, both the housing and the airbag fulfill a double function. On the one hand, the housing serves for the accommodation of the airbag. On the other hand, the covering of the housing, which is moved into the vehicle interior during an accident supports the knees of the occupant so that the latter is retained in his seat during an accident. The airbag which is unfolded and inflated past the covering and into the vehicle interior in turn supports the covering and presses the latter against the knees of the occupant. At the same time, the airbag prevents injuries to the upper torso and to the head of the occupant, who continues moving forward in the direction of travel during the sudden deceleration of the vehicle. Furthermore, by the use of said housing with said covering the construction of the airbag module is comparatively simple so that the manufacture of the airbag module in accordance with the invention is simpler in comparison with known airbag modules.

Thus, it is particularly advantageous when the covering is stiffened through additional stiffener elements. By this, the supporting forces which are exerted by the knees of the occupant on the covering during the accident are transmitted by the stiffened covering over a large area of the airbag, so that the pressure in the airbag acting to support the covering can be lower than if the corresponding supporting forces had to be taken up by the airbag in a point-like manner.

In a preferred further development of the invention a flap being pivotal into the vehicle interior is used as movable covering. The use of a flap as covering has on the one hand the advantage that the flap assumes a definite position relative to the housing during the unfolding of the airbag, whereby the unfolding of the airbag can be intentionally influenced when the flap is designed accordingly. On the other hand the forces which are exerted during the accident by the occupant on the flap are partially transmitted to the housing by the pivot points of the flap so that the airbag only needs to take up and to intercept a portion of the forces arising at the flap.

Furthermore, it is advantageous when the airbag is firmly connected to the inner side of the housing which faces the covering. By this, it is achieved that the airbag is supported via the housing at the body of the vehicle. Alternatively, it is possible to provide the airbag at an inner side of the covering.

In a further preferred embodiment of the invention the housing of the airbag module forms a pivotal lid of a glove compartment. In this way the airbag can be arranged space savingly in the vehicle interior. At the same time an additional lid for the glove compartment can be ceased.

The invention will be described in more detail in the following with reference to the embodiments and with reference to the drawings, wherein.

Figure 1:
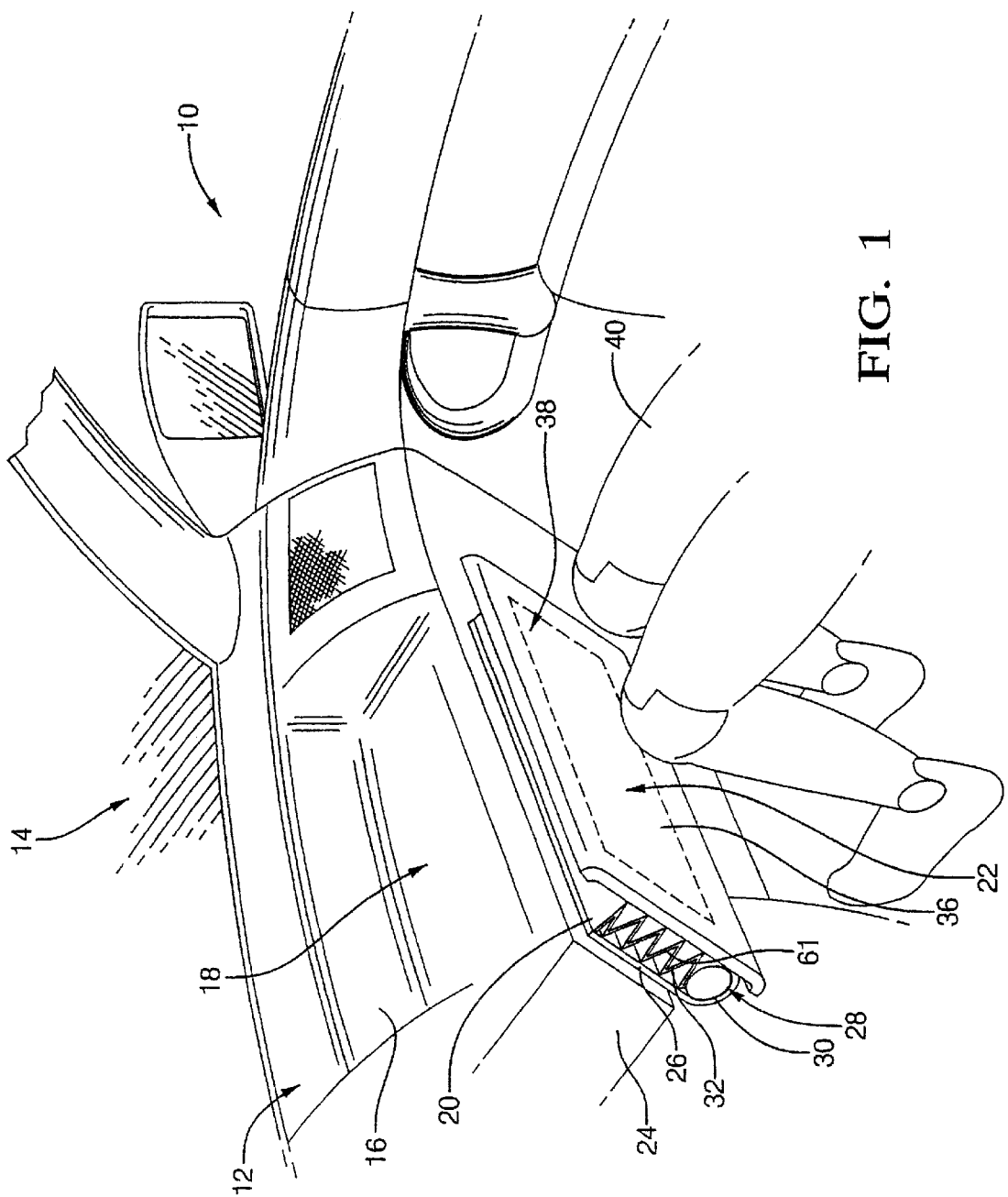
FIG. 1 shows a perspective view of a first embodiment of an airbag module which is provided in the vehicle interior of a motor vehicle on the front passenger's side.

FIG. 1 shows a perspective view of the front passenger's side in the vehicle interior of a motor vehicle 10. The vehicle interior is lined with a large number of liner elements 12. The lining in the front region of the vehicle interior forms a dashboard 16 which borders directly at a windshield 14 of the motor vehicle 10. At the upper side of the dashboard 16 a shelf 18 is molded at the front passenger's side. A first embodiment of an airbag module 20 is arranged below the shelf 18. The airbag module 20 has a housing 22 with a rear wall 26 which is secured at a body component 24 of the motor vehicle 10. The rear wall 26 is firmly connected to the body component 24 for example with screws or rivets.

Figure 2:
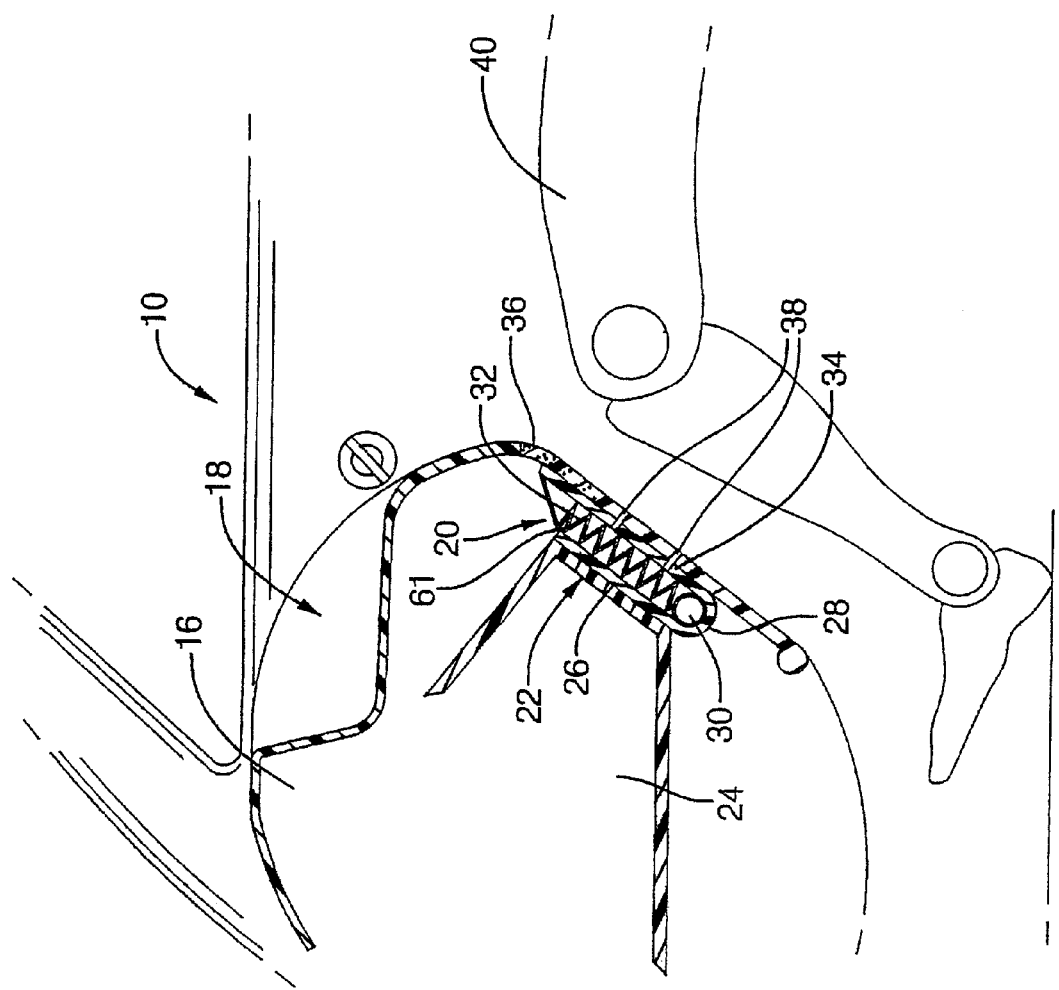
FIG. 2 shows a side view of the airbag module in accordance with FIG. 1 in an undeployed condition.

At the lower side 28 of the housing 22, which extends transversely to the longitudinal direction of the vehicle, a gas generator 30 for an airbag 32 is provided, said airbag being in FIGS. 1 and 2 illustrated in a folded manner. Furthermore, a rectangular flap 34 is pivotally journalled at the lower side 28 of the housing 22 and is held for example by holder lugs in a position in which the flap 34 extends parallel to the rear wall 26 and spaced apart from the latter. In the illustrated embodiment the sides and the upper side of the housing 22 are open so that only the rear wall 26, the lower side 28 and the flap 34 form an accommodation for the airbag 32. The airbag 32 is folded in a known manner to form an airbag packet which is inserted into the housing 22 and is connected to the gas generator 30.

The airbag module 20 is arranged behind a lining flap 36 which is pivotally journalled below the dashboard 16. By means of securing elements 38 the lining flap 36 is firmly connected at its rear side facing away from the vehicle interior to the outer side of the flap 34 facing away from the interior of the housing 22. The front side of the lining flap 36, which faces into the vehicle interior, is cushioned for example by a foam material.

Figure 3:
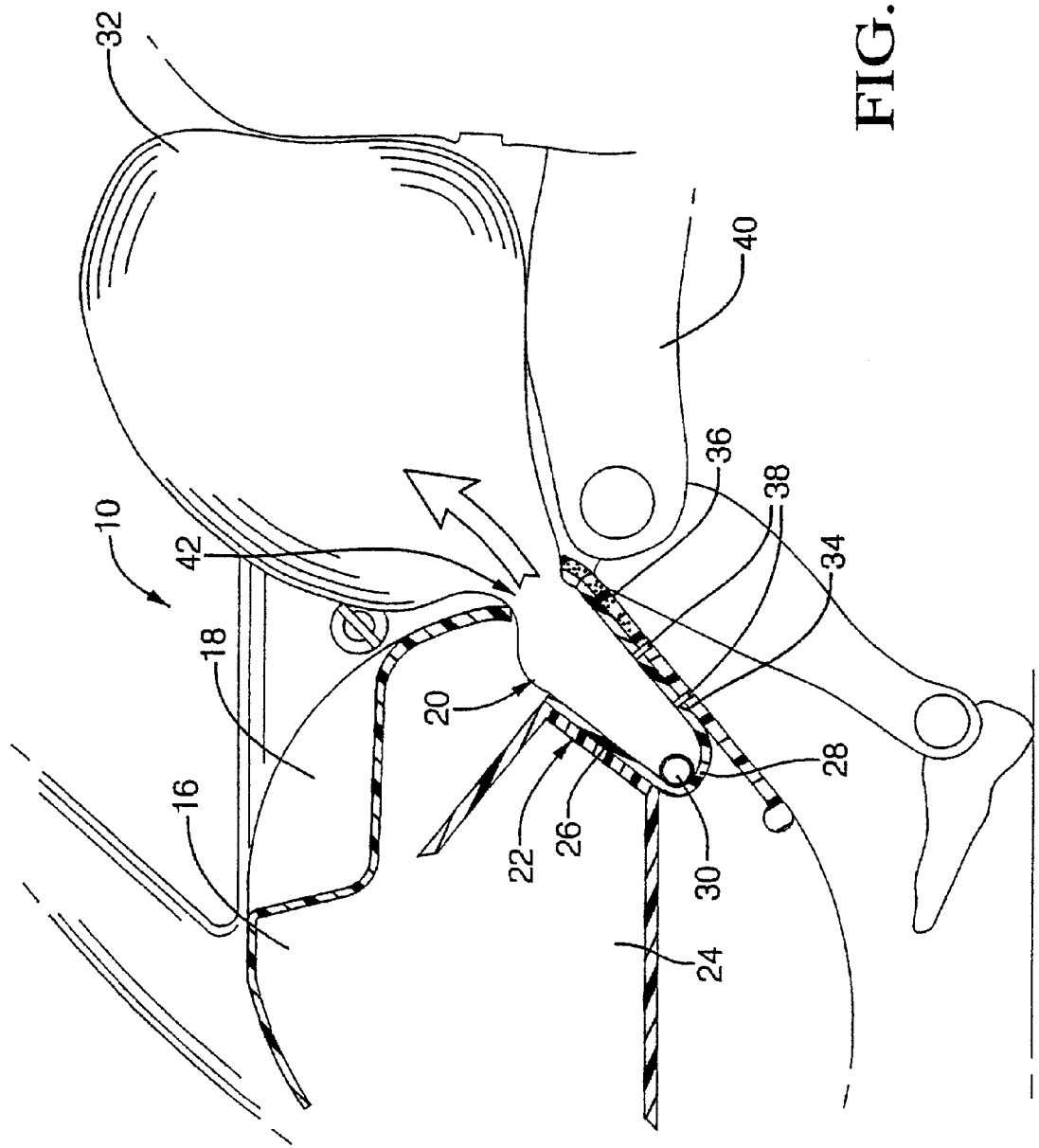
FIG. 3 shows a side view of the airbag module in accordance with FIG. 1 during the unfolding of the airbag.

In the following, the method of operation of the airbag module 20 will be explained in more detail with reference to FIGS. 2 and 3. As soon as the motor vehicle 10 becomes involved in a severe accident, the gas generator 30 is ignited by an ignition device (not illustrated). The gas generator 30 starts to inflate the airbag 32, through which the airbag 32 begins to unfold, whereas the flap 34 of the housing 22 still remains in its initial position. By means of the increasing gas volume in the airbag 32, said airbag 32 is further inflated, is braced at the inner side of the rear wall 26, while pressing against the flap 34. As soon as the force acting on the inner side of the flap 34 through the increasing volume of the airbag 32 is greater than the holding force with which the flap 34 is held closed, the flap 34 pivots in the direction of the vehicle interior. As a result, the cushioned lining flap 36 is opened at the same time and comes in contact with the knees of the front occupant 40. As soon as the flap 34 and the lining flap 36 are opened, the airbag 32 emerges from an opening 42 which is formed below the dashboard 16 and unfolds to its maximum size between the dashboard 16 and the upper torso of the front passenger 40.

Through the high pressure acting in the interior of the airbag 32 the flap 34 is pressed together with the lining flap 36 against the knees of the front passenger 40 so that the front passenger 40 is held in the front passenger's seat (not illustrated). At the same time, the completely inflated airbag 32 prevents the front passenger 40 from being injured at his upper torso or at his head.

Since the forces acting on the lining flap 36 and thus on the flap 34 in particular through the knees of the front passenger 40 are relatively significant, the flap 34 is stiffened in addition so that the forces arising are uniformly distributed over the entire width of the airbag 32.

Figure 4:
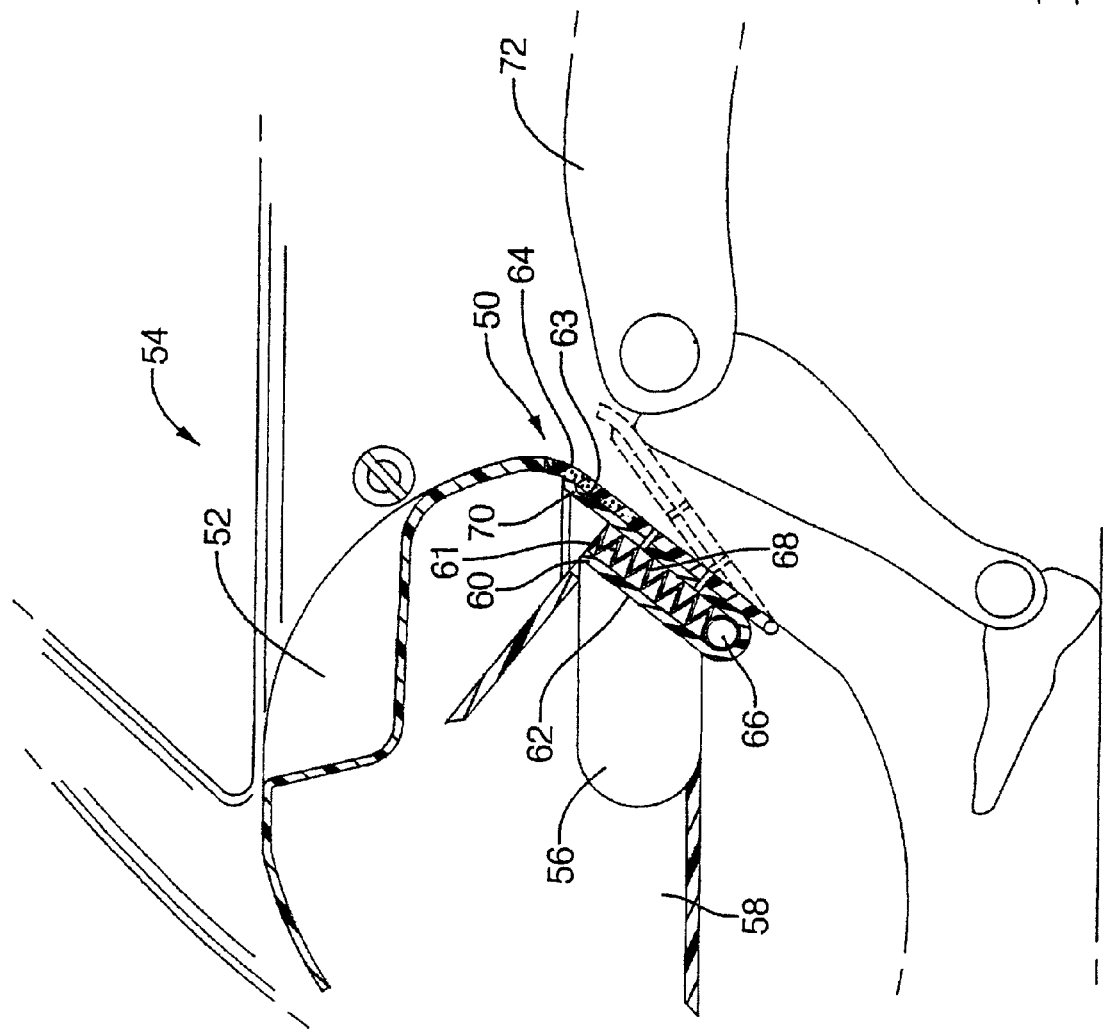
FIG. 4 shows a side view of a second embodiment of an airbag module, the housing of which forms a pivotal lid of a glove compartment.

FIG. 4 shows a second embodiment of an airbag module 50. In this embodiment the air bag module 50 also serves at the same time as a lid for a glove compartment 56 being arranged under a dashboard 52 of a vehicle 54 and being secured at a body component 58 of the vehicle 54. The airbag module 50 has a housing 60 formed of a rear wall 62, a front wall 63, and a flap 64. Housing 60 is pivotally journalled at a rear wall 62 to body component 58. At the under side of the housing 60, which extends transversly to the longitudinal direction of the vehicle 54, a gas generator 66 is secured, to which a folded airbag 68 being accommodated in the housing 60 is connected. At the sides and its upper side the housing 60 is closed for example by a thin plastic layer 61 in order on the one hand to protect the airbag 68 which is accommodated in the housing 60 and on the other hand to hold the flap 64 in a definite position with respect to the rear wall 62.

The housing 60 is pivotally journalled at its lower side at the body component 58 and at the same time serves as a lid for the glove compartment 56. For this purpose the housing 60 of the airbag module 50 can be pivoted back and forth between an open position (illustrated in broken lines) in which the glove compartment 56 is open and a closed position in which the glove compartment 56 is closed. Furthermore, a catch 70 is provided at the housing 60 by means of which the rear wall 62 of the housing 60 is locked at the body component 58 when the housing 60 is closing the glove compartment 56.

The method of operation of the airbag module 50 corresponds substantially to the method of operation of the above described first embodiment. In order to ensure a correct unfolding of the airbag 68 the housing 60, which is designed as the lid for the glove compartment 56, must however be pivoted into its closed position, in which it is locked at the body component 58. If the motor vehicle 54 is involved in certain accident conditions, the gas generator 66 is ignited and inflates the airbag 68. Through the unfolding airbag 68 the flap 64 of the housing 60 is opened and presses against the knees of a front passenger 72, who is held in his seat in this manner. As soon as the flap 64 has opened the housing 60, the unfolding airbag 68 emerges from the opened housing 60 and unfolds to its maximum size between the dashboard 52 and the upper torso of the front passenger 72. In this case as well the airbag 68 prevents injuries to the upper torso and the head of the front passenger 72, whereas at the same time the flap 64, which is pivoted into the vehicle interior by the airbag 68, holds the front passenger 72 in his seat.

In the above explained embodiments a housing was in each case described which is formed of a rear wall and a flap which is pivotally journalled at the latter. Alternatively, it is also possible to use a movable covering instead of a flap which is for example held at the rear wall by holder lugs and is moved by the airbag of the airbag module into the vehicle interior during an accident. It will also be understood that although the invention is described on a passenger side, that it may also be used on in other vehicle locations, such as the driver's side.

What is claimed is:

1. An air bag module for a vehicle having a dashboard and an occupant with knees, comprising:

a housing being configured for securement within an opening in the vehicle dashboard, said housing defining an interior volume;

an airbag which is normally stored in the interior volume of said housing in a folded condition;

a first cover being pivotally mounted to said housing for movement in a first direction between a first position and a second position, said first cover covering a portion of said airbag when said first cover is in said first position; and a second cover being connected to said first cover, said second cover being pivotally mounted to said dashboard at a point of securement below said first cover for movement in said first direction between an open position and a closed position, said closed position enclosing said first cover within said opening, said first cover enclosing said air bag within said interior volume when said first cover is in said first position and said first cover allowing a portion of said airbag to be released from said interior volume when said airbag is inflated by an inflator and said first cover moves from said first position to said second position, said second cover being urged opened along all sides except for said point of securement to move from said closed position by said first cover as said airbag is inflated and said second cover serves as a support for the knee of the occupant during the unfolding and inflating of the air bag; and the airbag being adapted to be unfolded through said opening and into the vehicle interior when said first cover is at least partly moved from said first position and said second cover is at least partially moved from said closed position.

2. An airbag module as in claim 1, wherein said first cover is pivotally journaled at said housing and said second cover is pivotally journaled at the vehicle dashboard.

3. An airbag module as in claim 1, wherein said first cover and said second cover are pivotal about an angle of less than 45°.

4. An airbag module as in claim 1, wherein said housing is open at its sides and has a rear wall at which said first cover is pivotally connected.

5. An airbag module as in claim 1, wherein said airbag is firmly connected to an inner side of said housing which faces said first cover.

6. An airbag module as in claim 1, wherein said airbag is folded in such a manner that it can be completely unfolded only when said first cover is in said second position and said second cover is in said open position.

7. An apparatus for restraining an occupant of a vehicle, comprising:
- a housing for mounting within a cavity below a portion of a dashboard of the vehicle, said housing comprising:
  - a rear wall being fixedly secured within said cavity;
  - a lower wall depending away from said rear wall; and
  - a flap being pivotally secured to said lower wall for movement between a first position and a second position, said flap being in a spatial relationship with respect to said rear wall when said flap is in said first position and said flap being in a further spatial relationship with respect to said rear wall when said flap moves towards said second position; and
  - an interior volume being defined by said rear wall, said lower wall and said flap;
- an airbag being configured and dimensioned to be stored and received within said interior volume when said airbag is in an uninflated state and said airbag being configured, dimensioned and positioned to extend outwardly from said cavity and restrain the occupant when said airbag is in an inflated state;
- an exterior flap having an inner surface and an outer surface, said inner surface of said exterior flap is fixedly secured to said flap, said exterior flap being pivotally secured to said dashboard at a point of securement for movement between an unrestraining position and a restraining position, said exterior flap covering said cavity and said housing when said exterior flap is in said un-restraining position and said exterior flap opens along all sides except for said point of securement to make contact with a portion of the occupant when said exterior flap is in said restraining position; and
- an inflator for inflating said airbag, said airbag causing said flap to pivot from said first position to said second position and said exterior flap pivots from said un-restraining position to said restraining position as said inflator inflates said airbag.

8. The apparatus as in claim 7, wherein said outer surface of said exterior flap is covered with a layer of cushioning.

9. The apparatus as in claim 8, wherein said layer of cushioning is a foam material.

10. The apparatus as in claim 7, wherein said exterior flap is pivotally secured to said dashboard at a position lower than said lower wall of said housing.

11. The apparatus as in claim 7, wherein said outer surface of said exterior flap is an exterior facade of said dashboard.

12. An apparatus for restraining an occupant of a vehicle having a dashboard, comprising:
- a housing being pivotally secured to a portion of the dashboard of the vehicle for movement between an open position and a closed position, said housing comprising:
  - a rear wall;
  - a lower wall depending away from said rear wall; and
  - a flap being pivotally secured to said lower wall for movement between a first position and a second position, said flap being in a spatial relationship with respect to said rear wall when said flap is in said first position and said flap being in a further spatial relationship with respect to said rear wall when said flap moves towards said second position; and
  - an interior volume being defined by said rear wall, said lower wall and said flap;
- an internal compartment housed within the dashboard, said internal compartment being configured, dimensioned and positioned behind said housing and said internal compartment being capable of being accessed as said housing pivots from said closed position to said open position;
- an airbag being configured and dimensioned to be stored and received within said interior volume when said airbag is in an un-inflated state and said airbag being configured, dimensioned and positioned to extend outwardly from said interior volume and restrain the occupant when said airbag is in an inflated state;
- an inflator for inflating said airbag, said airbag causing said flap to pivot from said first position to said second position as said inflator inflates said airbag, said flap making contact with a portion of the occupant when said flap is in said second position;
- a protective membrane being configured, dimensioned and positioned to extend from said rear wall, said lower wall and said flap and cover said airbag.

13. An apparatus as in claim 12, further comprising:
- a catch for securing said housing to a portion of the dashboard, said catch preventing said housing from pivoting from said closed position.

14. An apparatus as in claim 13, wherein said protective membrane provides structural support to said housing.

15. An airbag module as in claim 1, wherein said airbag is inflated by a gas generator being disposed longitudinally with respect to said point of securement.

16. The apparatus as in claim 7, wherein said inflator is disposed within said housing longitudinally with respect to said point of securement.

17. An apparatus for restraining an occupant of a vehicle, comprising:
- a housing being pivotally secured to the portion of the vehicle for movement between an open position and a closed position, said housing comprising:
  - a rear wall;
  - a lower wall depending away from said rear wall;
  - a flap being pivotally secured to said lower wall for movement between a first position and a second position, said flap being in a spatial relationship with respect to said rear wall when said flap is in said position and said flap being in a further spatial relationship with respect to said rear wall when said flap moves towards said second position;
  - an interior volume being defined by said rear wall, said lower wall and said flap; and
  - a plastic layer being configured to cover openings between said rear wall and said flap;
- an internal compartment housed within the vehicle, said internal compartment being positioned behind said housing and said internal compartment being capable of being accessed as said housing pivots from said closed position to said open position;
- an airbag being configured and dimensioned to be stored and received within said interior volume when said airbag in in an un-inflated state and said airbag being configured, dimensioned and positioned to extend outwardly from said interior volume and restrain the vehicle occupant when said airbag is in an inflated state; and an inflator for inflating said airbag, said airbag causing said flap to pivot from said first position to said second position as said inflator inflates said airbag, said flap making contact with a portion of the vehicle occupant when said flap is in said second position.

18. The apparatus as in claim 17, wherein said inflator is disposed within said housing longitudinally with respect to a point of securement of said flap to said lower wall.

19. The apparatus as in claim 17, wherein said plastic layer provides a definite position of said flap with respect to said rear wall.

20. The apparatus as in claim 17, further comprising a catch for securing said rear wall to a body component of the vehicle.

21. The apparatus as in claim 12, further comprising a catch for securing said rear wall to the portion of the dashboard.

22. The apparatus as in claim 12, wherein said housing is pivotally secured to a body component of a vehicle.

23. The apparatus as in claim 21, further comprising a catch for securing said rear wall to another portion of the dashboard of the vehicle.

* * * * *